US012632400B2

(12) United States Patent
Sancon et al.

(10) Patent No.: US 12,632,400 B2
(45) Date of Patent: May 19, 2026

(54) APPARATUSES AND METHODS FOR GENERATING A UNIQUE IDENTIFIER IN A MEMORY FOR I3C PROTOCOL

(71) Applicant: Micron Technology, Inc., Boise, ID (US)

(72) Inventors: John Christopher M. Sancon, Boise, ID (US); Keun Soo Song, Kanagawa (JP)

(73) Assignee: Micron Technology, Inc., Boise, ID (US)

( * ) Notice: Subject to any disclaimer, the term of this patent is extended or adjusted under 35 U.S.C. 154(b) by 53 days.

(21) Appl. No.: 18/908,532

(22) Filed: Oct. 7, 2024

(65) Prior Publication Data

US 2025/0156344 A1     May 15, 2025

Related U.S. Application Data

(60) Provisional application No. 63/598,841, filed on Nov. 14, 2023.

(51) Int. Cl.
| | |
|---|---|
| *G06F 13/16* | (2006.01) |
| *G06F 1/06* | (2006.01) |
| *G06F 13/42* | (2006.01) |

(52) U.S. Cl.
CPC ........... *G06F 13/1668* (2013.01); *G06F 1/06* (2013.01); *G06F 13/4291* (2013.01); *G06F 2213/0052* (2013.01)

(58) Field of Classification Search
None
See application file for complete search history.

(56) References Cited

U.S. PATENT DOCUMENTS

| | | | | |
|---|---|---|---|---|
| 4,821,184 A | * | 4/1989 | Clancy | G06F 9/4488 |
| | | | | 711/206 |
| 2015/0364163 A1 | * | 12/2015 | Song | G11C 7/225 |
| | | | | 365/189.05 |

* cited by examiner

*Primary Examiner* — Michael Sun
(74) *Attorney, Agent, or Firm* — Dorsey & Whitney LLP

(57) ABSTRACT

A memory device includes a current mirror coupled to an external resistor, wherein the current mirror is configured to provide a voltage having magnitude based on a resistance of the external resistor, and an oscillator configured to generate a clock signal having a frequency based on the voltage provided from the current mirror. The memory device further includes a counter configured to receive the clock signal and an identifier generation operation enable signal. In response to the identifier generation operation enable signal, counter is configured to provide a count value that adjust in response to the frequency of the clock signal, wherein the count value is used to assign a unique identifier for communication on a to memory module management control bus.

20 Claims, 5 Drawing Sheets

APPARATUSES AND METHODS FOR GENERATING A UNIQUE IDENTIFIER IN A MEMORY FOR I3C PROTOCOL

CROSS-REFERENCE TO RELATED APPLICATIONS

This application claims the filing benefit of U.S. Provisional Application No. 63/598,841, filed Nov. 14, 2023. This application is incorporated by reference herein in its entirety and for all purposes.

BACKGROUND

High data reliability, high speed of memory access, lower power consumption and reduced chip/package size are features that are demanded from semiconductor memory. As memory modules become more tightly packaged and/or include more individual components, being able to uniquely identify each component on a module may increase in difficulty. For example, designing every module to include arrays of resistors to provide unique identification for each location on a memory module printed circuit board may consume considerable area; especially when a module can include dozens of memory devices.

DETAILED DESCRIPTION

Figure 1:
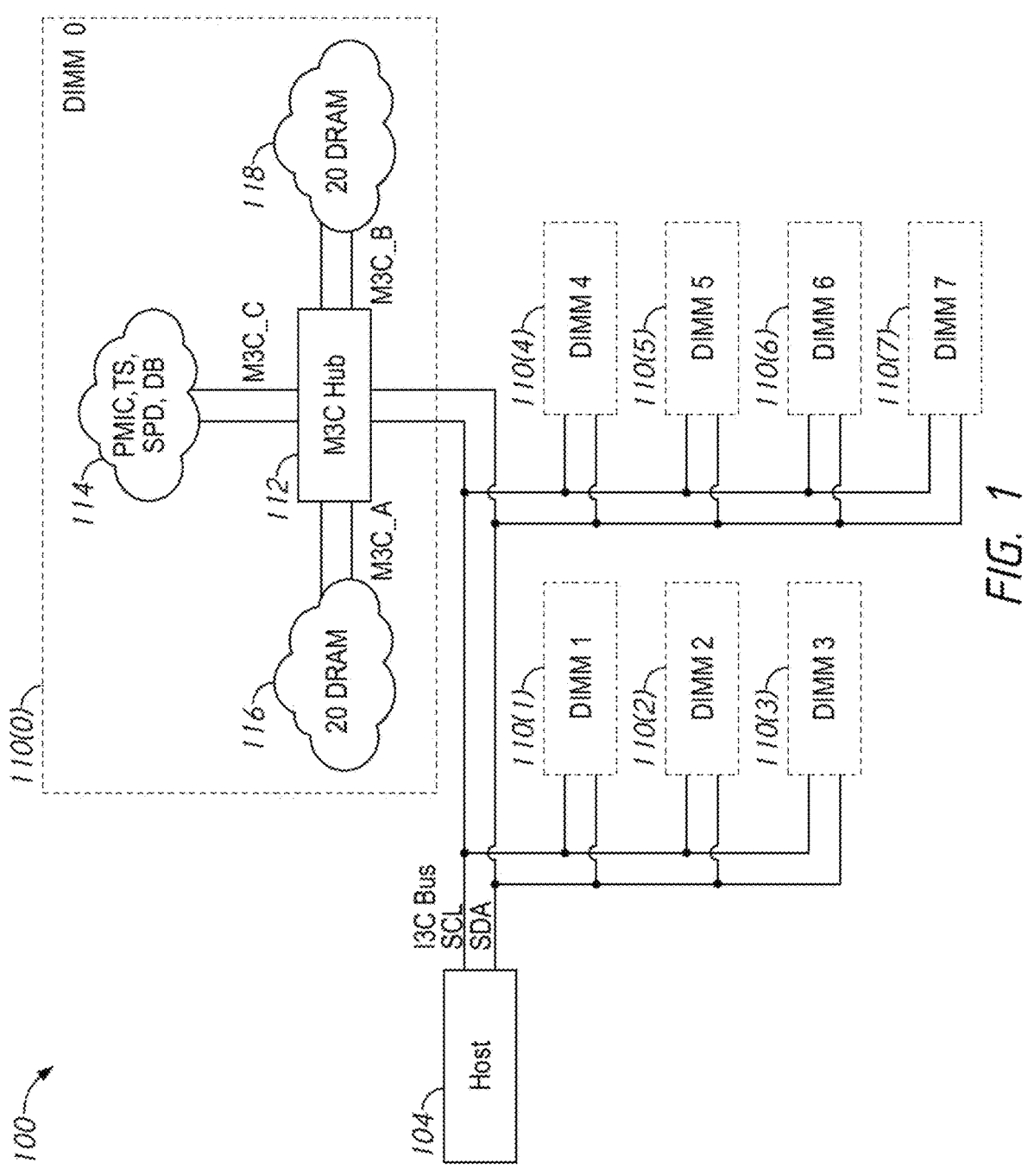
FIG. 1 is a block diagram of a memory system coupled to a host according to an embodiment of the present disclosure.

The following description of certain embodiments is merely exemplary in nature and is in no way intended to limit the scope of the disclosure or its applications or uses. In the following detailed description of embodiments of the present systems and methods, reference is made to the accompanying drawings which form a part hereof, and which are shown by way of illustration specific embodiments in which the described systems and methods may be practiced. These embodiments are described in sufficient detail to enable those skilled in the art to practice presently disclosed systems and methods, and it is to be understood that other embodiments may be utilized and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The following detailed description is therefore not to be taken in a limiting sense, and the scope of the disclosure is defined only by the appended claims.

This disclosure describes apparatuses and methods to assign unique identifiers for memory devices of a memory module to facilitate communication over a memory module management control (M3C) bus, such as M3C bus included in the I3C® specification from the mobile industry processor interface (MIPI) Alliance. A memory module may include many individual memory devices. To support the memory devices, the memory module may include other components that facilitate timing, data transfer, power management, initialization, etc. For example, the memory module may include a serial presence detect component configured to provide information about the memory module (e.g., a number of memory packages, types of memory, etc.), a power management integrated circuit (PMIC) to manage power delivery to components on the memory module, temperature sensors to monitor temperatures on the memory module, a control hub (e.g., an M3C hub)/register clock driver configured to manage communication (e.g., manage timing signals, control signals (commands and addresses for memory commands), and other exchanges of information) between a host and the various components on the memory module. In some examples, functionality of one or more of these components may be included in a single package.

In some examples, the host may communicate with the control hub over the M3C bus. In some examples, the M3C bus may include a clock signal and a data channel. The M3C bus may be a sideband bus that includes only two wires, a serial clock wire and a serial data wire. In some examples, the communication on the M3C bus may be configured according to a standard, such as the I3C® standard. In some examples, communication between the host and the components of the memory module may rely on an ability to identify (for data received at the host) or target (for data sent from the host) a particular component of the memory module for a variety of reasons. To facilitate this identification, each component on the memory module may be assigned a unique identifier. For example, when a component of the memory module detects an issue, such as a temperature outside of a specified range or a voltage outside of a specified range, that component may send an in-band interrupt (IBI) message to the host to alert the host of the problem. A set of bits in the message from the component may include a unique identifier assigned to the component that identifies to the host of the component that is the source of the message. In some examples, the unique identifier may include seven (7) bits, with three bits identifying a particular memory module socket number in a memory system with the remaining four bits identifying the target component. More of fewer bits may be included based on a count of different addressable components in the system.

The M3C bus may operate in an open drain mode (e.g., an arbitration mode), where when multiple components across the memory modules are vying for control to communicate over the M3C bus, the component with the lowest unique identifier may win the arbitration. The memory modules may include circuitry that is configured to leverage this feature of the M3C to assign the unique identifiers. For example, each of the memory devices of the memory module may be coupled to a unique external resistor, and may include circuitry configured to generate the unique identifiers based on a resistance of the unique external resistor. During an identifier generation operation, each memory device may attempt to take control of the M3C bus using a count value that changes according to a frequency determined by the unique external resistor. Because each unique external resistor, the frequencies at which the count values change may be different. Thus, in some examples, a memory device with a highest frequency count value adjustment may take control of the M3C bus first, and may then be assigned a first unique identifier. The second memory device with a next highest frequency count value adjustment may take control of the M3C bus second, and may then be assigned a second unique identifier. And so on through every memory device. In other examples, unique identifiers may be assigned in ascending order of frequency of the count value adjustment.

In some examples, the identifier generation circuitry of each memory device may include a current mirror coupled to the unique external resistor, which may be used to control oscillation frequency of a clock signal provided from an oscillator. The counter at each of the memory devices may be configured to decrement or increment based on oscillations of the clock signal during the identifier generation operation. Because each of the resistors has a unique value, the count values from each of the memory devices may change at a different frequency for each memory device, which may facilitate sequential control of the M3C bus in an order that can be used to assign the unique identifiers. Using internal circuitry to generate the unique identifier may reduce cost and save space on the memory module as compared with implementations that include installing multiple resistors for each memory device to be read to determine the unique identifier.

FIG. 1 is a block diagram of a memory system 100 coupled to a host 104 according to an embodiment of the present disclosure. The memory system 100 may be coupled to the host 104 via an I3C bus to send and receive data and timing signals. The memory system 100 may include memory modules 110(0)-(7). The memory modules 110(0)-(7) may include dual, inline memory modules (DIMMs) (e.g., registered DIMMs, load reduction DIMMs (LRDIMM), micro DIMMs, non-volatile DIMMs (NVDIMMs) (e.g., including non-volatile memory and a controller (not shown)), or any other type of DIMMs).

In the interest of brevity and clarity, FIG. 1 depicts details of the memory module 110(0). It is appreciated that the other memory modules 110(1)-(7) may each include similar features without departing from the scope of the disclosure.

The memory module 110(0) may include a M3C hub 112, module control devices 114, first group of memory devices 116, and second group of memory devices 118. The M3C hub 112 may be configured to may be configured to communicate with the host 104 using control and address information and clock or timing signals transmitted via the control bus I3C. The M3C hub 112 may be configured to provide transfer information between from the module control devices 114, the first group of memory devices 116 and/or second group of memory devices 118 via an internal M3C bus. The module control devices 114 may include components configured to manage operation of the memory module 110(0), such as a serial presence detect component configured to provide information about the memory module (e.g., a number of memory packages, types of memory, etc.), at least one PMIC to manage power delivery to components on the memory module, temperature sensors to monitor temperatures on the memory module, etc. The first group of memory devices 116 and the second group of memory devices 118 may each include a group of memory devices. The memory devices may include devices, packages, and/or memory die. In some examples, the memory devices may each include one or more memory die stacks. The memory devices may each include dynamic, random-access memory (DRAM) (e.g., double data rate (DDR) 4 DRAM, DDR5 DRAM, DDR6 DRAM, etc.), in some examples. In some examples, the memory module 110(0) may only include one of the first group of memory devices 116 and the second group of memory devices 118 or the first group of memory devices 116 and the second group of memory devices 118 may be combined into a single group.

The M3C hub 112 may communicate with components of each of the module control devices 114, the first group of memory devices 116, and the second group of memory devices 118 using a different internal M3C bus M3C_A/B/C, respectively. In some examples, communication between the host 104 and the components of the memory modules 110(0)-(7) may rely on an ability to identify (for data received at the host 104) or target (for data sent from the host 104) a particular component of the memory modules 110(0)-(7) for a variety of reasons. For example, when a component of the memory module detects an issue, such as a temperature outside of a specified range or a voltage outside of a specified range, that component may send an in-band interrupt (IBI) message to the host 104 to alert the host 104 of the problem. A set of bits in the message from the component may include a unique identifier assigned to the component that identifies to the host 104 of the component that is the source of the message. In some examples, the unique identifier may include seven (7) bits, with three bits identifying a particular memory module 110(0-(7) socket number with the remaining four bits identifying the target component. More of fewer bits may be included based on a count of different addressable components in the system. In some examples, each component of the module control devices 114, the first group of memory devices 116, or the second group of memory devices 118 may each be assigned a unique identifier.

In some examples, components of the module control devices 114 may include only one or two of each type of component. Thus, generating unique identifiers may be accomplished via single pin connected to a high or low voltage, or in some examples in need of a third state, may be left floating. However, because the first group of memory devices 116 and the second group of memory devices 118 may each include multiple (e.g., 4, 8, 20, etc.) individual memory devices, a similar architecture may be inefficient.

The components of the first group of memory devices 116 and the second group of memory devices 118 may leverage the arbitration mode of the I3C bus to assign the unique identifiers. In the arbitration mode, when multiple components across the memory modules 110(0)-(7) are vying for control to communicate over the M3C bus, the component with the lowest unique identifier may win the arbitration. The memory devices of the first group of memory devices 116 and the second group of memory devices 118 may include circuitry that is configured to leverage this feature of the M3C to assign the unique identifiers. For example, each of the memory devices of the first group of memory devices 116 and the second group of memory devices 118 may be coupled to a unique external resistor, and may include circuitry configured to generate the unique identifiers based on a resistance of the unique external resistor. The individual unique external resistors may be a components installed at the printed circuit board of the memory module 110(0), and coupled to a particular pin of a respective memory device. During an identifier generation operation, each memory device may attempt to take control of the M3C bus using a count value that changes according to a frequency determined by the unique external resistor. Because each unique external resistor, the frequencies at which the count values change may be different. Thus, in some examples, a memory device with a highest frequency count value adjustment may take control of the M3C bus first, and may then be assigned a first unique identifier. The second memory device with a next highest frequency count value adjustment may take control of the M3C bus second, and may then be assigned a second unique identifier. And so on through every memory device. In other examples, unique identifiers may be assigned in ascending order of frequency of the count value adjustment.

In operation, the host 104 and components of the memory modules 110(0)-(7) may generally provide serial data over the M3C/I3C bus, along with a single clock signal used to synchronize timing of the serial data. The serial data may include the unique identifier that identifies a target or source one of the memory modules 110(0)-(7) and a corresponding component on the target or source one of the memory modules 110(0)-(7). For example, when a component of one of the memory modules 110(0)-(7) detects an issue (e.g. such as a temperature outside of a specified range, a voltage outside of a specified range, error correction code (ECC) incorrect, clock timing characteristics are unexpected, etc.), that component may send an in-band interrupt (IBI) over the M3C and I3C buses to the host 104 to alert the host 104 of the problem. In some examples, the M3C hub 112 may provide control plane communication between respective components of the memory modules 110(0)-(7) over the respective M3C bus, including components of the module control devices 114, the first group of memory devices 116, and the second group of memory devices 118.

As noted above, each of the memory devices of the first group of memory devices 116 and/or the second group of memory devices 118 of the memory modules 110(0)-(7) may include circuitry to assign unique identifiers by reading the respective unique external resistor. The components of the first group of memory devices 116 and the second group of memory devices 118 may leverage the arbitration mode of the I3C bus to assign the unique identifiers. In the arbitration mode, when multiple components across the memory modules 110(0)-(7) are vying for control to communicate over the M3C bus, the component with the lowest unique identifier may win the arbitration. The host 104 may put the I3C bus in arbitration mode and then may send a signal to the memory modules 110(0-(7) to initiate the identifier generation operation. During the identifier generation operation, each memory device of the first group of memory devices 116 and the second group of memory devices 118 may attempt to take control of the respective M3C bus using a count value that changes according to a frequency determined by the unique external resistor. Because each unique external resistor, the frequencies at which the count values change may be different. Thus, in some examples, a memory device with a highest frequency count value adjustment may take control of the M3C bus first, and may then be assigned a first unique identifier. The second memory device with a next highest frequency count value adjustment may take control of the M3C bus second, and may then be assigned a second unique identifier. And so on through every memory device. In other examples, unique identifiers may be assigned in ascending order of frequency of the count value adjustment.

Using internal circuitry to generate the unique identifier may reduce cost and save space on the memory modules 110(0)-(7) as compared with implementations that include installing multiple resistors for each memory device to be read to determine the unique identifier.

Figure 2:
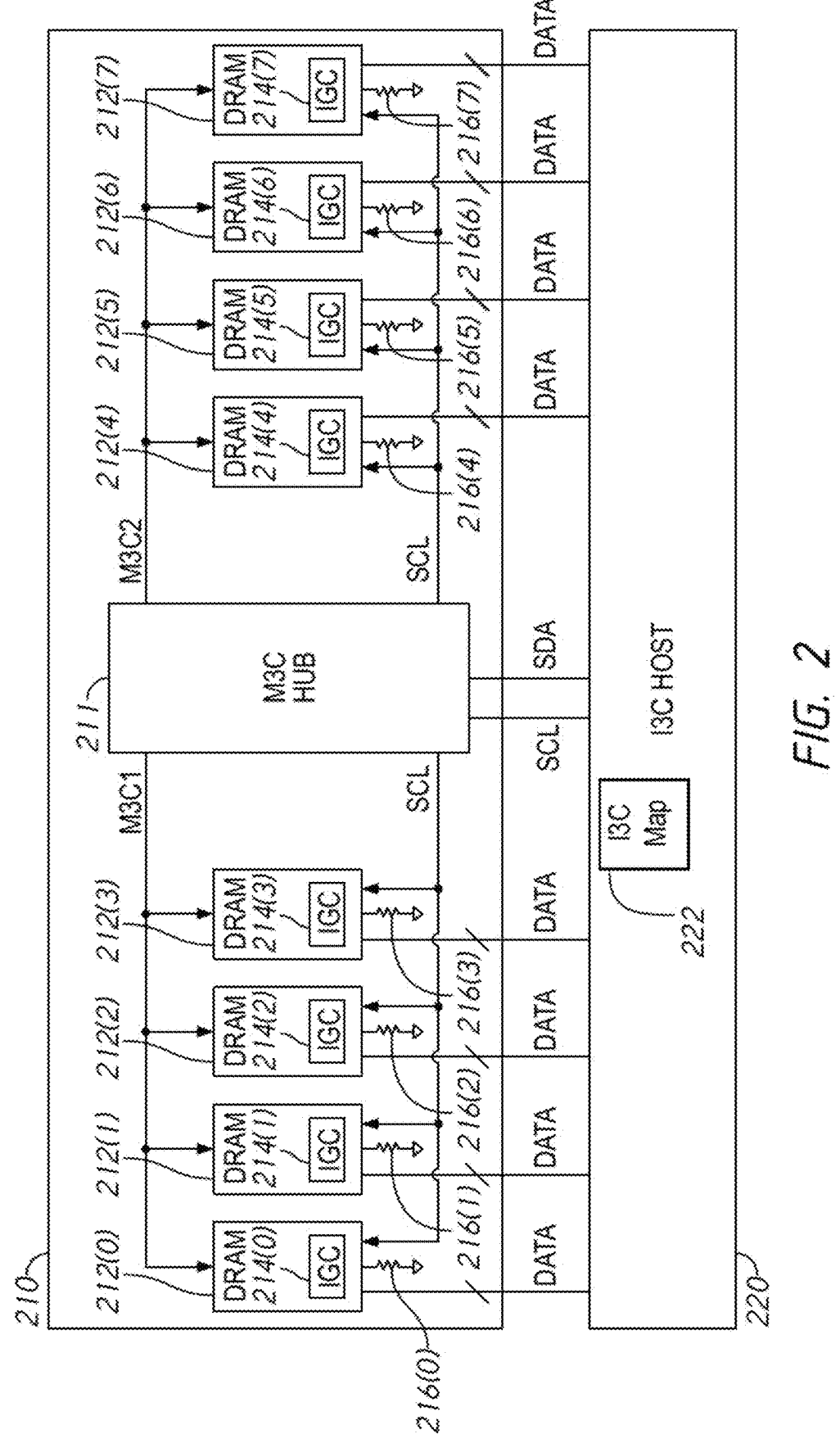
FIG. 2 is a block diagram of a memory system including a memory module according to an embodiment of the present disclosure.

FIG. 2 is a block diagram of a memory system 200 including a memory module 210 according to an embodiment of the present disclosure. The memory module 210 may include memories 212(0)-(7) coupled to M3C hub 211. Each of the memories 212(0)-(7) may include memory packages and/or memory devices. In some examples, any of the memory modules 110(0)-(7) of FIG. 1 may implement the memory module 210. The memory module 210 may be configured to communicate with a memory controller 220 to perform operations based on a serial clock signal SCL and serial data SDA received via the I3C bus. In some examples, write data provided to and read data provided from the memories 212(0)-(7) may be communicated over separate data buses, as shown. While the memory module 210 is depicted in FIG. 2 having 8 memories 212(0)-(7), it is appreciated that the memory module 210 may include more or less than 8 memories without departing from the scope of the disclosure. In some examples, the memory module 210 may include an additional memory (not shown) that is used for error correcting code (ECC) storage.

In some examples, the memory controller 220 may include I3C map 222 that maps components of the memory module 210 (e.g., the memories 212(0)-(7), the M3C hub 211, a PMIC (not shown), temperature sensor(s) (not shown), SPD chip (not shown), etc.) to unique identifiers to facilitate targeted communication.

In some examples, the memories 212(0)-(7) may all be the same type of memory. In other examples, the memories 212(0)-(7) may be a mix of different types of memories. In some examples, each of the memories 212(0)-(7) may implement the semiconductor device 100 of FIG. 1, the memory package 200 of FIG. 2, or any combination thereof. The memory module 210 may include a dual, inline memory module (DIMM), including a registered DIMM, a load reduction DIMM (LRDIMM), a micro DIMM, non-volatile DIMM (NVDIMM) (e.g., including non-volatile memory and a controller (not shown)), or any other type of DIMM.

In some embodiments, the memories 212(0)-(7) may be organized into different physical ranks and/or may be included on one or both sides of the memory module 210. In some embodiments, there may be 8, 16, or more memories per physical rank, and one or more physical ranks in the memory module 210. For example, the memory module 210 may include a first physical rank on a first side of the memory module 210 (e.g., the 8 memories 212(0)-(7)), and a second physical rank on a back side of the memory module 210 (e.g., 8 more memories on a reverse side of the memory module 210).

The M3C hub 211 may be configured to communicate with the memory controller 220 to receive the SCL and SDA signals over the I3C bus. The M3C hub 211 may include a register clock driver that is configured to provide the SCL signal and the control signals received via the I3C bus to the memories 212(0)-(7). The M3C hub 211 may communicate with the memories 212(0)-(3) via a first control bus M3C1 and may communicate with the memories 212(4)-(7) via a second control bus M3C2. The M3C hub 211 may further include circuitry to store and provide information about the memory module 210, such as number of memories, number of ranks, types of memory, configuration information for the memory module 210, etc.

To communicate over the I3C bus, each component of the memory module 210 may be assigned a unique identifier. Thus, each of the memory devices 212(0)-(7) may be coupled to a unique external resistor 216(0)-(7) and include respective identifier generation circuitry 214(0)-(7) configured to generate the unique identifiers by based on a resistance of the respective unique external resistor 216(0)-(7). The unique external resistors 216(0)-(7) may be a components installed at the printed circuit board of the memory module 210, and coupled to a particular pin of a respective memory 212(0)-(7). In some examples, the identifier generation circuitry 214(0)-(7) may include a current mirror coupled to the unique external resistor 216(0)-(7) that is used to control frequency of a clock signal provided from an oscillator, and a counter configured to adjust a count value at a frequency of the clock signal. The 220 may place the I3C bus in arbitration mode and then may send a signal to the 210 to initiate the identifier generation operation. During the identifier generation operation, each of the memories 212(0)-(7) may attempt to take control of the respective M3C bus using a count value that changes according to a frequency determined by the unique external resistor. Because each unique external resistor, the frequencies at which the count values change may be different. Thus, in some examples, a memory of the memories 212(0)-(7) with a highest frequency count value adjustment may take control of the M3C bus first, and may then be assigned a first unique identifier. The memory of the memories 212(0)-(7) with a next highest frequency count value adjustment may take control of the M3C bus second, and may then be assigned a second unique identifier. And so on through every memory device. In other examples, unique identifiers may be assigned in ascending order of frequency of the count value adjustment.

Using internal circuitry to generate the unique identifier may reduce cost and save space on the memory module 210 as compared with implementations that include installing multiple resistors for each memory device to be read to determine the unique identifier.

Figure 3:
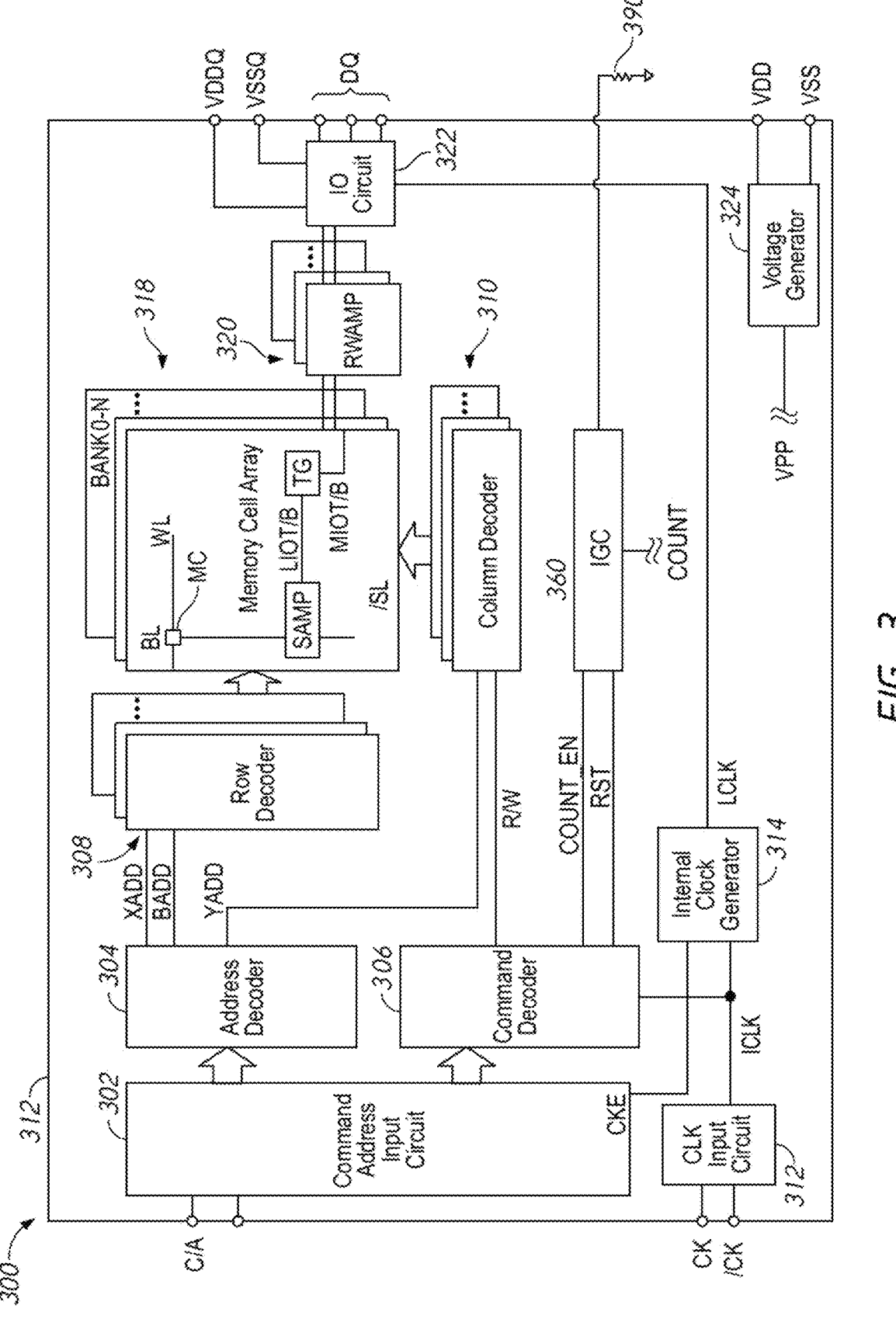
FIG. 3 is a block diagram of a semiconductor device according to at least one embodiment of the disclosure.

FIG. 3 is a block diagram of a semiconductor device 300 according to at least one embodiment of the disclosure. The semiconductor device 300 may be a semiconductor memory device, such as a dynamic, random-access memory (DRAM) device (e.g., double data rate (DDR) 4 DRAM, DDR5 DRAM, DDR6 DRAM, etc.) integrated on a single semiconductor chip. The example device 300 may be formed on a substrate 323. The memory devices of the first group of memory devices 116 and/or the second group of memory devices 118 of FIG. 1 and/or the memories 212(0)-(7) of FIG. 2 may implement the semiconductor device 300, in some examples.

The semiconductor device 300 includes a memory array 318. The memory array 318 may be positioned in a die of the memory stack 325. The memory array 318 is shown as including a plurality of memory banks. In the embodiment of FIG. 3, the memory array 318 is shown as including eight memory banks BANK0-N. Each of the memory banks BANK0-N may include a plurality of word lines WL, a plurality of bit lines BL and/BL, and a plurality of memory cells MC arranged at intersections of the plurality of word lines WL and the plurality of bit lines BL and/BL. The selection of the word line WL is performed by a row decoder 308 and the selection of the bit lines BL and/BL is performed by a column decoder 310. The row and column decoders 308 and 310 may also be positioned in the dies of the memory stack 325. In the embodiment of FIG. 3, the row decoder 308 includes a respective row decoder for each memory bank and the column decoder 310 includes a respective column decoder for each memory bank. The bit lines BL and/BL are coupled to a respective sense amplifier (SAMP). Read data from the bit line BL or/BL is amplified by the sense amplifier SAMP, and transferred to read/write amplifiers 320 over complementary local data lines (LIOT/B), transfer gate (TG), and complementary main data lines (MIOT/B). Conversely, write data outputted from the read/write amplifiers 320 is transferred to the sense amplifier SAMP over the complementary main data lines MIOT/B, the transfer gate TG, and the complementary local data lines LIOT/B, and written in the memory cell MC coupled to the bit line BL or/BL.

The semiconductor device 300 may employ a plurality of external terminals that include command and address (C/A) terminals coupled to a command and address bus to receive commands and addresses, and a CS signal, clock terminals to receive clocks CK and/CK, data terminals DQ to receive and provide channel data (e.g., via a multi-signal line channel data bus), and power supply terminals to receive power supply potentials VDD, VSS, VDDQ, and VSSQ. The external terminals may be positioned on the substrate 323.

The clock terminals are supplied with external clocks CK and/CK that are provided to an input circuit 312. The external clocks may be complementary. The input circuit 312 generates an internal clock ICLK based on the CK and/CK clocks. The ICLK clock is provided to the command decoder 310 and to an internal clock generator 314. The internal clock generator 314 provides various internal clocks LCLK based on the ICLK clock. The LCLK clocks may be used for timing operation of various internal circuits. The internal data clocks LCLK are provided to the input/output circuit 322 to time operation of circuits included in the input/output circuit 322, for example, to data receivers to time the receipt of write data.

The C/A terminals may be supplied with memory addresses. The memory addresses supplied to the C/A terminals are transferred, via a command/address input circuit 302, to an address decoder 304. The address decoder 304 receives the address and supplies a decoded row address XADD to the row decoder 308 and supplies a decoded column address YADD to the column decoder 310. The address decoder 304 may also supply a decoded bank address BADD, which may indicate the bank of the memory array 318 containing the decoded row address XADD and column address YADD. In some embodiments, the address decoder 304 may also indicate a particular memory die of the memory stack 325 for activation. The C/A terminals may be supplied with commands. Examples of commands include timing commands for controlling the timing of various operations, access commands for accessing the memory, such as read commands for performing read operations and write commands for performing write operations, as well as other commands and operations. The access commands may be associated with one or more row address XADD, column address YADD, and bank address BADD to indicate the memory cell(s) to be accessed.

The commands may be provided as internal command signals to a command decoder 306 via the command/address input circuit 302. The command decoder 306 includes circuits to decode the internal command signals to generate various internal signals and commands for performing operations. For example, the command decoder 306 may provide a row command signal to select a word line and a column command signal to select a bit line.

The semiconductor device 300 may receive an access command which is a read command. When a read command is received, and a bank address, a row address and a column address (and optional die address) are timely supplied with the read command, read data is read from memory cells in the memory array 318 corresponding to the row address and column address. The read command is received by the command decoder 306, which provides internal commands so that read data from the memory array 318 is provided to the read/write amplifiers 320. The read data is output to outside from the data terminals DQ via the input/output circuit 322.

The semiconductor device 300 may receive an access command which is a write command. When the write command is received, and a bank address, a row address and a column address (and optional die address) are timely supplied with the write command, write data supplied to the data terminals DQ is written to a memory cells in the memory array 318 corresponding to the row address and column address. The write command is received by the command decoder 306, which provides internal commands so that the write data is received by data receivers in the input/output circuit 322. Write clocks may also be provided to the external clock terminals for timing the receipt of the write data by the data receivers of the input/output circuit 322. The write data is supplied via the input/output circuit 322 to the read/write amplifiers 320, and by the read/write amplifiers 320 to the memory array 318 to be written into the memory cell MC.

The power supply terminals are supplied with power supply potentials VDD and VSS. The power supply potentials VDD and VSS are supplied to an internal voltage generator circuit 324. The internal voltage generator circuit 324 generates various internal potentials VPP, VOD, VARY, VPERI, and the like based on the power supply potentials VDD and VSS supplied to the power supply terminals. The internal potential VPP is mainly used in the row decoder 308, the internal potentials VOD and VARY are mainly used in the sense amplifiers SAMP included in the memory array 318, and the internal potential VPERI is used in many peripheral circuit blocks.

The power supply terminals are also supplied with power supply potentials VDDQ and VSSQ. The power supply potentials VDDQ and VSSQ are supplied to the input/output circuit 322. The power supply potentials VDDQ and VSSQ supplied to the power supply terminals may be the same potentials as the power supply potentials VDD and VSS supplied to the power supply terminals in an embodiment of the disclosure. The power supply potentials VDDQ and VSSQ supplied to the power supply terminals may be different potentials from the power supply potentials VDD and VSS supplied to the power supply terminals in another embodiment of the disclosure. The power supply potentials VDDQ and VSSQ supplied to the power supply terminals are used for the input/output circuit 322 so that power supply noise generated by the input/output circuit 322 does not propagate to the other circuit blocks.

In some examples, the semiconductor device 300 may be implemented to be used in a memory module, and thus may be configured to communicate with a M3C hub via the C/A terminals and/or the data DQ terminals. Because the semiconductor device 300 may be one of memory device on the memory module, it may need to have a unique identifier UID to allow the M3C hub (and the downstream host) to identify the source of any information provided by the semiconductor device 300. To generate the unique identifier, the semiconductor device may include an identifier generation circuitry 360 coupled to an external resistor 390. In some examples, identifier generation circuitry 360 may include a current mirror coupled to the external resistor 390 that is used to control oscillation frequency of a clock signal provided from an oscillator, and a counter configured to adjust a count value based on a frequency of the clock signal to determine the unique identifier UID. The resistance of the external resistor 390 may be different for each semiconductor device 300, and as such, may result in a different frequency at the oscillator. In some examples, the identifier generation circuitry 360 may initiate an identifier generation operation in response to a reset RST and/or a count enable COUNT_EN signal from the command decoder 306 (in response to a command received via the C/A terminals), such as at a power-up or reset. In some examples, the identifier generation circuitry 360 may also reset the unique identifier UID in response to the RST signal from the command decoder 306 (e.g., prior to starting the identifier generation operation). Assignment of the unique identifier UID may be determined using the identifier generation circuitry 360 as part of a bus arbitration over an I3C (e.g., memory module control) bus. For example, control of a bus may be based on a lowest COUNT<3:0> value. Thus, in the count down scenario, the semiconductor device 300 device with the fastest COUNT<3:0> change will have the lowest number and will be assigned a first unique identifier UID (e.g., lowest or highest). The semiconductor device 300 with the second fastest COUNT<3:0> change will be assigned the next unique identifier, and so on. The COUNT<3:0> change frequency may be selected based on a resistance of the external resistor 390.

Using the identifier generation circuitry 360 to generate the unique identifier UID may reduce cost and save space on the memory module as compared with implementations that include installing multiple resistors for each memory device to be read to determine the unique identifier.

Figure 4:
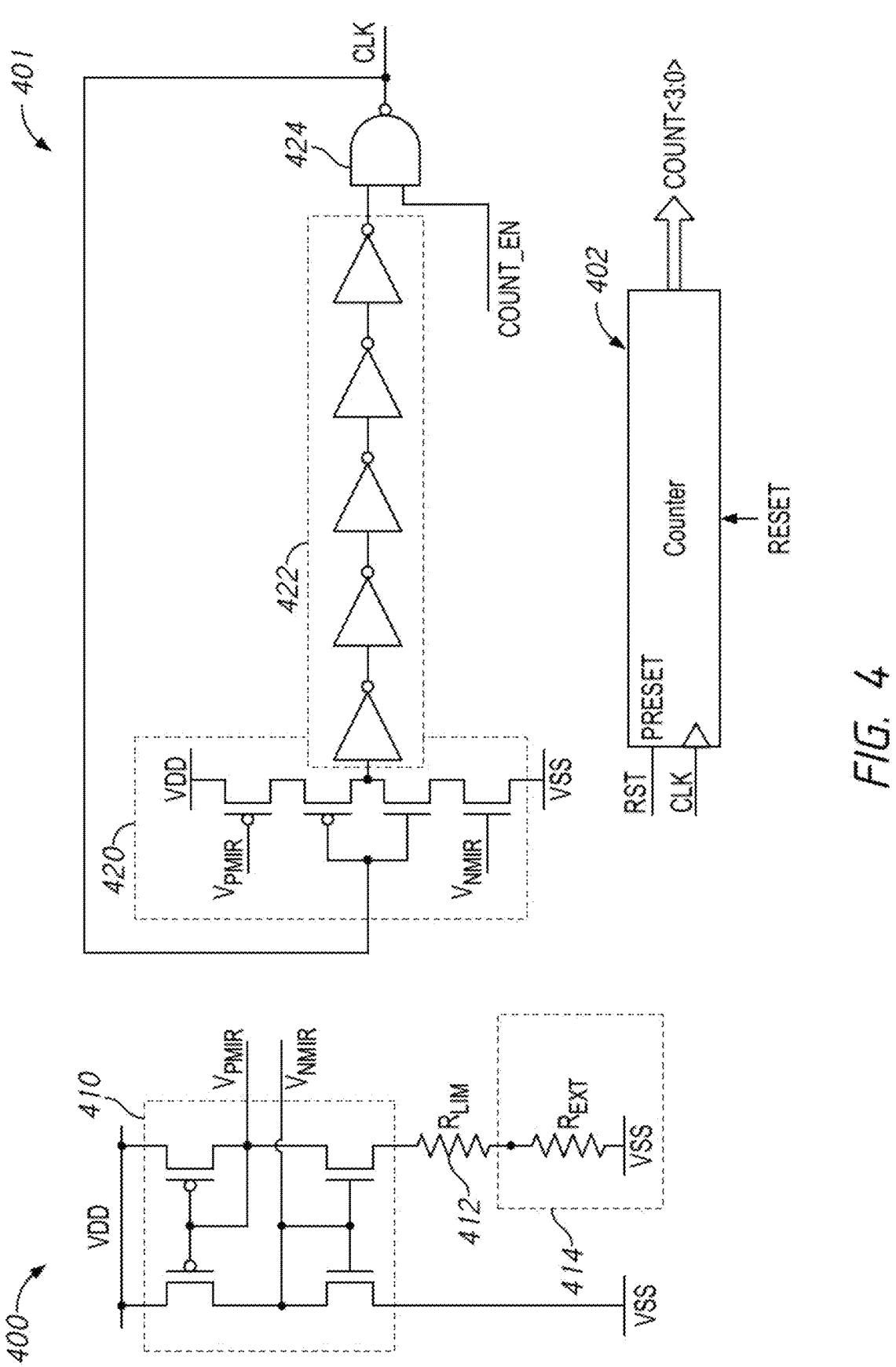
FIG. 4 is a schematic block diagram of identifier generation circuitry according to an embodiment of the present disclosure.

FIG. 4 is a schematic block diagram of identifier generation circuitry according to an embodiment of the present disclosure. The identifier generation circuitry may be implemented in the memory devices of the first group of memory devices 116 and/or the second group of memory devices 118 of FIG. 1, the memories 212(0)-(7) of FIG. 2, the identifier generation circuitry 360 of FIG. 3, or any combination thereof. The identifier generation circuitry may include a current mirror circuit 400, an oscillator 401, and a counter 402.

The current mirror circuit 400 may include a current mirror 410 having one leg coupled to a reference voltage VSS via a limit resistor 412 coupled in series with an external resistor 414 and the other leg coupled to the reference voltage VSS. A resistance of the external resistor 414 may control current provided through the current mirror, which will control output voltages VPMIR and VNMIR. A lower resistance of the external resistor 414 may create higher current and vice versa.

The oscillator 401 may include a frequency control and feedback circuit 420, a series of serially-coupled inverters 422, and a NAND gate 424. One set of inputs (e.g., gates of each of a first p-type transistor and n-type transistor pair) of the frequency control and feedback circuit 420 may be coupled to the clock output CLK of the NAND gate 424. A second set of inputs (e.g., gates of each of a second p-type transistor and n-type transistor pair) of the frequency control and feedback circuit 420 may be configured to receive the VPMIR and VNMIR signals, respectively. The output of the frequency control and feedback circuit 420 may be provided to an input of a first one of the series of serially-coupled inverters 422. The signal may propagate through the series of serially-coupled inverters 422 to a first input of the NAND gate 424. A second input of the NAND gate 424 may be configured to receive a count enable signal COUNT_EN. In response to the COUNT_EN signal being active, the oscillator 401 may oscillate the CLK signal at a frequency determined based on the VPMIR and VNMIR signals, which varies based on a value of the external resistor 414. Thus, a higher value of the external resistor 414 may cause the VPMIR and VNMIR signals to provide a lower frequency through the current mirror 410 and vice versa.

The counter 402 may be configured to count oscillations of the CLK signal provided from the current mirror 410 over a predetermined period of time to generate a count COUNT<3:0> value that is used to determine the unique identifier UID. In other examples, the counter 402 is configured to count down, and the reset signal RST presets the COUNT<3:0> value to 15 (e.g., 1111b). In some examples, the counter 402 is configured to count up, and the reset signal RST resets the COUNT<3:0> value to zero (e.g., 0000b).

To use the identifier generation circuitry of FIG. 4 may be used as part of a bus arbitration over an I3C (e.g., memory module control) bus to assign the unique identifiers. For example, control of a bus may be based on a lowest unique identifier. Thus, in the count down scenario, the memory device with the fastest COUNT<3:0> changes will have the lowest number and will be assigned a first unique identifier UID. The memory device with the second fastest COUNT<3:0> changes will be assigned a second unique identifier, and so on.

Figure 5:
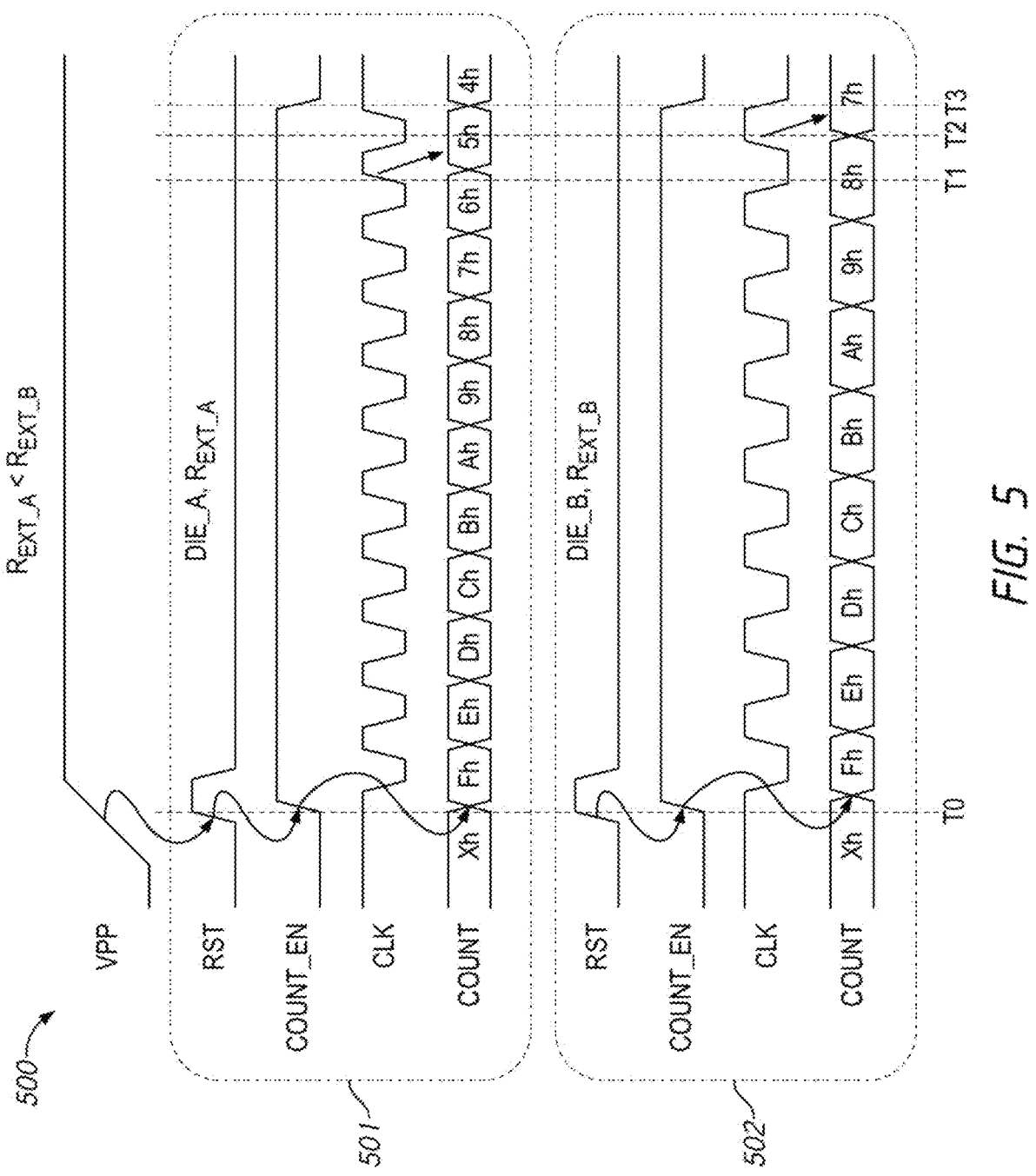
FIG. 5 is an illustrations of timing diagrams, respectively, depicting operation of unique identifier generation circuitry for a first device and a second device in accordance with an embodiment of the present disclosure.

FIG. 5 is an illustrations of timing diagrams 500, respectively, depicting operation of unique identifier generation circuitry for a first device 501 and a second device 502 in accordance with an embodiment of the present disclosure. The first device 501 may be coupled to a first external resistor REXT_A and the second device 502 may be coupled to a second external resistor REXT_B having a lower resistance than the first external resistor REXT_A. The first device 501 and the second device 502 may include any of the memory devices of the first group of memory devices 116 and/or the second group of memory devices 118 of FIG. 1, any of the memories 212(0)-(7) of FIG. 2, the semiconductor device 300 of FIG. 3, and/or may include may include the identifier generation circuitry of FIG. 4, in some examples.

Prior to time TO, a pulse may be initiated on the reset signal RST signal to reset counters of the identifier generation circuitry (e.g., the identifier generation circuitry 360 of FIG. 3 or the counter 402 of FIG. 4) of both the first device 501 and the second device 502 to Fh (e.g., 1111b). Between times T0 and T3, an identifier generation operation window may be enabled based on activation of the COUNT_EN signal provided to both the first device 501 and the second device 502.

During the identifier generation operation window, in response to the COUNT_EN signal, the respective clock signals CLK of each of the first device 501 and the second device 502 may begin toggling. Because the second external resistor REXT_B has a lower resistance than the first external resistor REXT_A, the CLK signal of the first device 501 may toggle faster, which may cause the COUNT value for the first device 501 to change before the COUNT value changes on the second device 502. Thus, toward the end of the identifier generation operation window, the first device 501 may have a count value of 5 h (in response to the clock at time T1) and the second device 502 may have a count value of 7 h (in response to the clock at time T2). The faster changing (and ultimately lower) COUNT value may allow the first device 501 to win arbitration of an I3C bus over the second device 502 upon closure of the identifier generation operation window. By winning arbitration of the I3C bus, the first device 501 may be assigned a unique identifier UID before the second device 502. Additional devices could be included in the identifier generation operation without departing from the scope of the disclosure. At time T3, the COUNT_EN signal may be set inactive at both the first device 501 and the second device 502, closing the identifier generation operation window.

The timing diagram 500 is exemplary for illustrating operation of various described embodiments. Although the timing diagram 500 depicts a particular arrangement of signal transitions of the included signals, one of skill in the art will appreciate that additional or different transitions may be included in different scenarios without departing from the scope of the disclosure. Further, the depiction of a magnitude of the signals represented in the timing diagram 500 is not intended to be to scale, and the representative timing is an illustrative example of a timing characteristics.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above-discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. An apparatus comprising:
   a first memory device coupled to a memory module management control (M3C) bus and to a first resistor having a first resistance value, wherein, during an identifier generation operation, the first memory device is configured to provide a first count value to the M3C bus that changes at a frequency determined based on the first resistance value;
   a second memory device coupled to the M3C bus and to a second resistor having a second resistance value, wherein, during the identifier generation operation, the second memory device is configured to provide a second count value to the M3C bus that changes at a frequency determined based on the second resistance value,
   wherein, in response to the first count value changing at a higher frequency than the second count value, the first memory device is assigned a first unique identifier to communicate over the M3C bus and the second memory device is assigned a second unique identifier to communicate over the M3C bus; and
   wherein, in response to the first count value changing at a lower frequency than the second count value, the first memory device is assigned the second unique identifier to communicate over the M3C bus and the second memory device is assigned the first unique identifier to communicate over the M3C bus.

2. The apparatus of claim 1, wherein the first memory device includes a first oscillator configured to generate a first clock signal having the first frequency based on the first resistance value of the first external resistor and the second memory device includes a second oscillator configured to generate a second clock signal having the second frequency based on the second resistance value of the second external resistor.

3. The apparatus of claim 2, wherein the first oscillator includes a series of serially-coupled inverters.

4. The apparatus of claim 2, wherein the first memory device includes a current mirror coupled to the first external resistor, wherein the current mirror is configured to provide a voltage to the first oscillator having magnitude based on the first resistance of the first external resistor.

5. The apparatus of claim 2, wherein the first memory device includes a counter configured to provide the first count value adjust in response to the first clock signal.

6. The apparatus of claim 5, wherein the counter configured to increment the first count value in response to the first clock signal.

7. The apparatus of claim 5, wherein the counter configured to decrement the first count value in response to the first clock signal.

8. The apparatus of claim 5, wherein the counter configured to reset to a default value prior to starting the identifier generation operation.

9. The apparatus of claim 1, wherein first memory device and the second memory device are each configured to receive a signal to initiate the identifier generation operation.

10. The apparatus of claim 1, further comprising a control hub configured to initiate the identifier generation operation and to assign the first unique identifier and the second unique identifier among the first memory device and the second memory device.

11. A memory device comprising:

a current mirror coupled to an external resistor, wherein the current mirror is configured to provide a voltage having magnitude based on a resistance of the external resistor;

an oscillator configured to generate a clock signal having a frequency based on the voltage provided from the current mirror; and a counter configured to receive the clock signal and a identifier generation operation enable signal, wherein in response to the identifier generation operation enable signal, counter is configured to provide a count value that adjust in response to the frequency of the clock signal, wherein the count value is used to assign a unique identifier for communication over a memory module management control bus.

12. The memory module of claim 11, wherein the external resistor is coupled to a first leg of the current mirror between an output and a supply voltage and a second leg of the current mirror is coupled to the supply voltage.

13. The memory module of claim 11, wherein the counter is configured to reset to a default count value in response to the identifier generation operation enable signal and before adjusting based on the frequency of the clock signal.

14. The memory module of claim 11, wherein the counter is configured to increment based on the frequency of the clock signal.

15. The memory module of claim 11, wherein the counter is configured to decrement based on the frequency of the clock signal.

16. A method comprising:

during an identifier generation operation:

providing, from a first memory device, a first count value to the M3C bus that changes at a frequency determined based on a first resistance value of a first external resistor;

providing, from a second memory device, a second count value to the M3C bus that changes at a frequency determined based on a second resistance value of a second external resistor;

in response to the first count value changing at a higher frequency than the second count value:

assigning a first unique identifier to communicate over the M3C bus to the first memory device; and assigning a second unique identifier to communicate over the M3C bus to the second memory device; and in response to the first count value changing at a lower frequency than the second count value:

assigning the second unique identifier to communicate over the M3C bus to the first memory device; and assigning the first unique identifier to communicate over the M3C bus to the second memory device.

17. The method of claim 16, further comprising:

generating a first clock signal having the first frequency based on the first resistance value of the first external resistor via an oscillator at the first memory device, wherein the first count value is adjusted in response to the first clock signal; and generating a second clock signal having the second frequency based on the second resistance value of the second external resistor via an oscillator at the first memory device, wherein the second count value is adjusted in response to the second clock signal.

18. The method of claim 17, further comprising providing a first voltage via a current mirror of the first memory device coupled to the first external resistor having magnitude based on the first resistance of the first external resistor.

19. The method of claim 17, further comprising incrementing the first count value in response to the first clock signal.

20. The method of claim 16, further comprising resetting the first count value and the second count value to default values prior at a start of the identifier generation operation.

* * * * *